(12) United States Patent
Pontoppidan

(10) Patent No.: US 6,691,662 B2
(45) Date of Patent: Feb. 17, 2004

(54) AIR INTAKE MANIFOLD WITH SUDDEN ENLARGEMENT FOR INTERNAL COMBUSTION ENGINE

(75) Inventor: Michaël Pontoppidan, Colombes (FR)

(73) Assignee: Magneti Marelli France, Nanterre (FR)

( * ) Notice: Subject to any disclaimer, the term of this patent is extended or adjusted under 35 U.S.C. 154(b) by 0 days.

(21) Appl. No.: 10/181,632
(22) PCT Filed: Apr. 2, 2001
(86) PCT No.: PCT/FR01/00978
§ 371 (c)(1), (2), (4) Date: Jul. 19, 2002
(87) PCT Pub. No.: WO01/75295
PCT Pub. Date: Oct. 11, 2001

(65) Prior Publication Data
US 2003/0010310 A1 Jan. 16, 2003

(30) Foreign Application Priority Data
Apr. 4, 2000 (FR) .............................................. 00 04274

(51) Int. Cl.⁷ .............................................. F02M 35/10
(52) U.S. Cl. .................. 123/184.53; 181/229
(58) Field of Search ...................... 123/184.53, 184.57; 181/229

(56) References Cited

U.S. PATENT DOCUMENTS

| | | |
|---|---|---|
| 4,727,829 A | 3/1988 | Kondo et al. |
| 4,854,271 A | 8/1989 | Miyano et al. |
| 5,150,669 A | 9/1992 | Rush, II et al. |

FOREIGN PATENT DOCUMENTS

| | | |
|---|---|---|
| DE | 195 32751 | 3/1997 |
| FR | 1 513 513 | 5/1968 |
| GB | 2 239 898 | 7/1991 |
| JP | 52 154921 | 12/1977 |

Primary Examiner—Noah P. Kamen
(74) Attorney, Agent, or Firm—Sturm & Fix LLP

(57) ABSTRACT

The invention concerns an intake manifold (1) comprising a plenum (8) and air ducts (13) one of which at least, for each combustion chamber of the engine, has a sudden enlargement (19) of its passage cross-section, immediately followed in downstream direction by a duct portion (20) having a gradually decreasing cross-section and ending (21) upstream of a flange fixing (16) the manifold (1) to the engine and its cylinder head. The plenum (8) and each of the air ducts (13) at least are made of synthetic material, preferably capable of being molded. The invention is useful for equipping internal combustion engine with pistons driven in reciprocating movement in the cylinders.

11 Claims, 2 Drawing Sheets

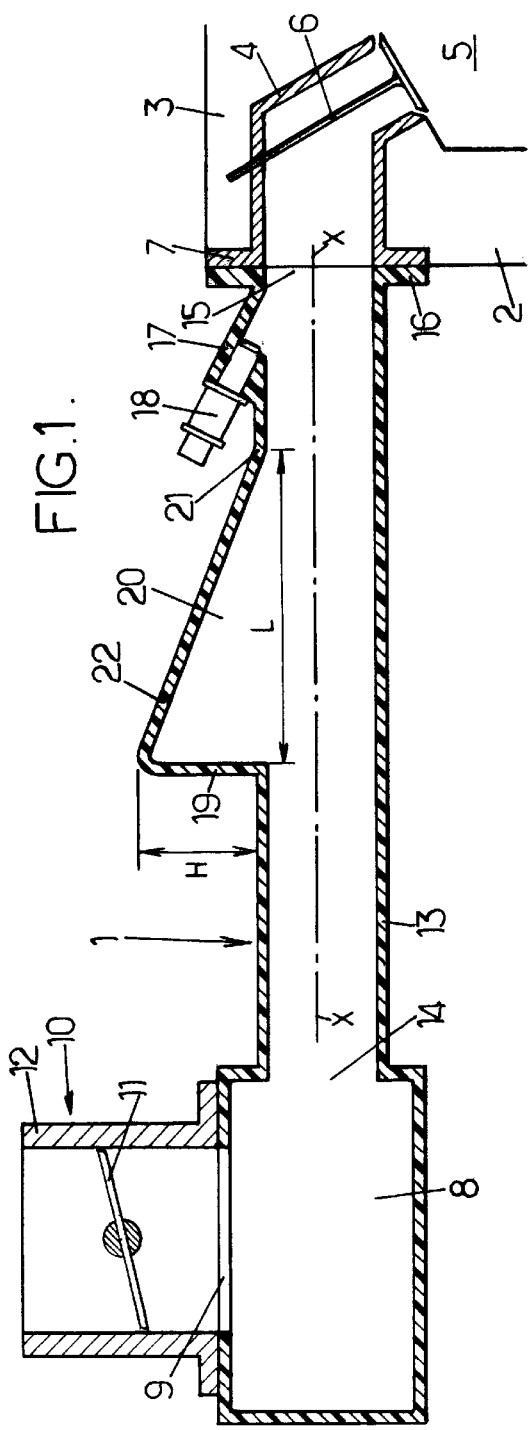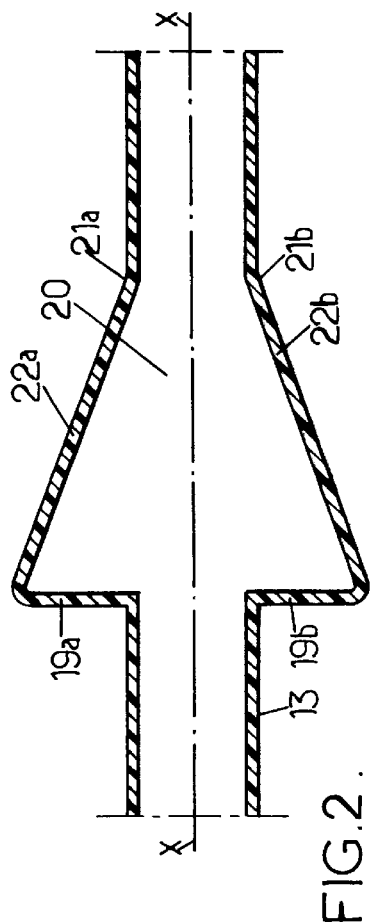

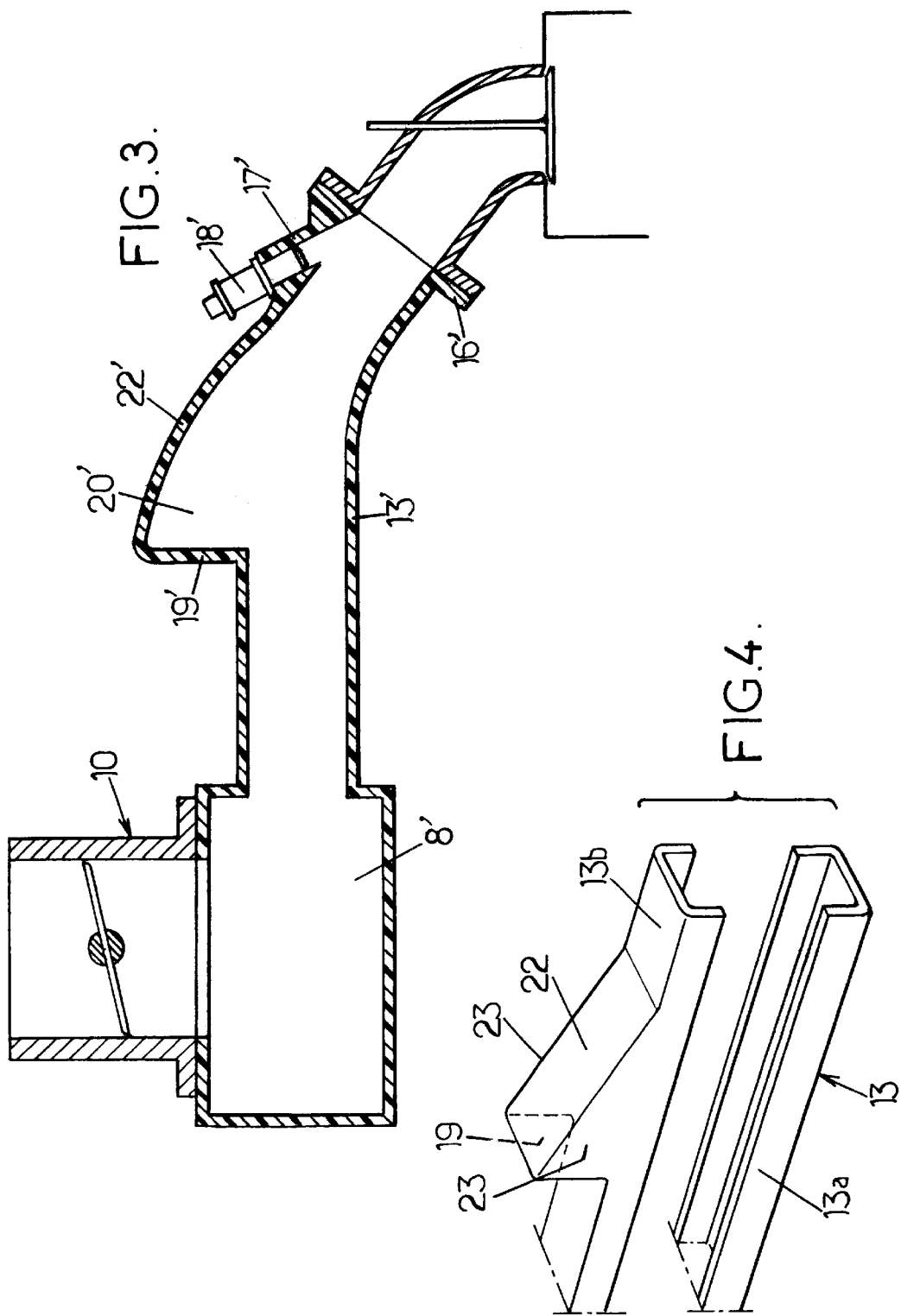

AIR INTAKE MANIFOLD WITH SUDDEN ENLARGEMENT FOR INTERNAL COMBUSTION ENGINE

CROSS REFERENCE TO RELATED APPLICATIONS

This application is a National Phase of PCT No. FR01/00978 filed Apr. 2, 2001, claiming priority of French Application No. 0004274 filed Apr. 4, 2000, which are included in their entirety by reference made hereto.

BACKGROUND OF THE INVENTION

1. Field of the Invention

The present invention relates to an air intake manifold for an internal combustion engine, particularly of the type comprising at least one combustion chamber and at least one cylinder in which a piston is given a reciprocating movement, the combustion chamber being supplied with air and with fuel by the opening of at least one intake valve which selectively closes an intake duct in a cylinder head of the engine.

2. Description of the Related Art

To supply such an engine with air, it is known practice for use to be made of an air intake manifold comprising:

- an upstream plenum, common to all the downstream air ducts feeding the combustion chambers of the engine and supplied with air through an air inlet orifice connected to a device for controlling the intake of air to the engine, such as a throttle body, mounted upstream of said inlet orifice, and,
- for each combustion chamber of the engine, at least one of the downstream air ducts connecting a respective outlet orifice of the plenum to a corresponding supply orifice of the corresponding combustion chamber of the engine, the supply orifice being formed in at least one flange that fixes the manifold to the cylinder head of the engine, the plenum and each of the air ducts at least being made of synthetic material which is generally a technical—grade plastic.

In these known intake manifolds, essentially made of plastic, the air ducts generally have a passage cross section which is constant in terms of shape and/or in terms of cross-sectional area, or which have a progressive change in shape, changing progressively from a circular cross section to a rectangular or square cross section with rounded corners, or vice versa, and/or a passage cross section which decreases very progressively and very slightly from the upstream end downstream, to form convergent ducts.

Whatever the engine, there are speed and load combinations for which it is possible to find a corresponding position of the throttle valve that controls the stream of air let into the engine, during the lift of an intake valve, upon the opening by the latter of the corresponding intake duct, in the intake phase into a corresponding combustion chamber of the engine, and an intake valve lift amplitude for which the air flow conditions around the intake valve are sonic conditions, at the same time as the surfaces wetted by the air flow over this intake valve and over the seat of this valve are such that brief strident whistling occurs, of high acoustic intensity.

Given that the onset of the whistling is brought about by a specific and tailored ratio between the throughput cross section of the throttle body and that of the intake cross section, the noise is manifested in a sustained way on an engine turning over during a rotational movement of said throttle valve—typically during an opening at low engine rotational speed from light load toward heavy load.

When the intake manifold as defined hereinabove is made of a metal casting, such as an aluminum casting, its mass is high enough for the whistling to be deadened sufficiently to the point where it is not deemed to be troublesome with respect to the criteria customarily applied to the optimizing of a vehicle. By contrast, in the case of air intake manifolds made essentially of plastic materials, it is found that this strident whistling is not deadened and may be audible from outside, when not concealed by other running noises of the engine and of its environment.

BRIEF SUMMARY OF THE INVENTION

The problem underlying the invention is that of overcoming this particularly troublesome disadvantage of air intake manifolds of the type defined hereinabove, essentially made of plastic and, more generally, of proposing means making it possible to make air intake manifolds quieter.

To this end, the intake manifold according to the invention, of the type explained hereinabove, is characterized in that, for each combustion chamber of the engine, at least one corresponding downstream air duct has at least one sudden enlargement of its passage cross section, followed immediately in the downstream direction by a duct portion having a progressive reduction in cross section in the downstream direction, ending upstream of the flange for fixing to the cylinder head of the engine.

The sudden enlargement of the air duct thus creates a lag interface in the transmission of the pressure gradient signal, caused in the region of the throttle body, because of the sudden variation in the density of the air in the sudden enlargement, and the duct portion with the progressive reduction in cross section which follows on from the sudden enlargement constitutes a zone in which the air stream reaccelerates, at least partially compensating for the pressure drop caused by the sudden enlargement, and allowing energy recovery similar to that which can be obtained by a Venturi effect.

Thus, the noise is not eliminated but offset, with respect to the conditions suited to whistling at the intake valve and its seat, by virtue of a lag in the transmission of the pressure wave, which is introduced into the air duct.

The sudden enlargement by sudden increase in the passage cross section of the air duct may be ensured on at least two opposite sides of this air duct or along the entire periphery thereof, particularly when its cross section is circular or oblong, it being possible for the sudden enlargement and the duct portion with the progressive reduction in cross section to be of revolution about the longitudinal axis of the duct. However, it is also possible for the sudden increase in cross section to be ensured on just one side of the longitudinal axis of the air duct, something which is advantageous when each air duct is produced by joining together, for example by thermal fusion or by ultrasonic or vibration welding, two half-shells each molded as a single piece, because the sudden enlargement and the duct portion with the progressive reduction in cross section can be exhibited by at least one of the two half-shells, on which this enlargement and this portion with progressive reduction of cross section are produced by the molding of this half-shell.

Advantageously also, the ratio of the cross section of the air duct at the sudden enlargement to the cross section of the air duct immediately upstream of said sudden enlargement is of the order of 2.

Furthermore, if the cross section of the air ducts is substantially quadrilateral, it is advantageous for the duct portion with a progressive reduction in cross section to extend over a length, along the longitudinal axis of the air duct, of between about 2.5 and about 3 times the height of the sudden enlargement, which height is measured substantially at right angles to said longitudinal axis of the air duct at said sudden enlargement, if, indeed, the width of the air duct at right angles to its height and its length is substantially constant.

When, in the known way, each air duct has, upstream of the corresponding supply orifice in the flange for fixing to the cylinder head, a housing for a fuel injector injecting this fuel to the supply orifice, it is also advantageous for the duct portion with a progressive reduction in cross section to have its downstream end situated upstream of said housing for the injector.

In general, it is advantageous for the sudden enlargement and the duct portion with a progressive reduction in cross section to be situated substantially in the downstream half of the corresponding air duct.

The sudden enlargement and the duct portion with a progressive reduction in cross section may be situated in a substantially straight part of the air duct in which case, according to a simple and economical structure of the manifold, the duct portion with a progressive reduction in cross section is advantageously at least partially delimited by at least one inclined plane if the air duct has a rectangular cross section, or by at least one portion of a cone frustum, if the air duct has a circular or oblong cross section.

By contrast, if the sudden enlargement and the duct portion with progressive reduction in cross section are situated in a curved part of the air duct it is preferable for the duct portion with a progressive reduction in cross section to be at least partially delimited by a curved surface with the concave side facing in the same direction as the curved part of the air duct.

BRIEF DESCRIPTION OF THE DRAWINGS

Other advantages and features of the invention will become apparent from the description given hereinbelow, by way of nonlimiting example, of exemplary embodiments which are described with reference to the appended drawings in which:

FIG. 1 is a schematic view in axial section of a first example of an air intake manifold according to the invention and mounted on the cylinder head of an internal combustion engine, FIG. 2 is a view in axial section of an alternative form of embodiment of part of the intake manifold of FIG. 1, at the sudden enlargement and at the duct portion with the progressive reduction in cross section, FIG. 3 is a view similar to FIG. 1 of a second example of an intake manifold, with air ducts which are curved in their downstream part, and FIG. 4 is a perspective schematic view of two molded half-shells made of plastic for producing an air duct of the manifold according to FIG. 1.

DETAILED DESCRIPTION OF THE INVENTION

The air intake manifold 1 of FIG. 1 supplies air to an internal combustion engine 2 of the type with reciprocating movement of a piston in each cylinder of the engine 2, with which a cylinder head 3, mounted on the engine 2, delimits, for each piston, a combustion chamber 5. This chamber 5 is supplied with an air-fuel mixture by at least one intake duct 4 formed in the cylinder head 3 and opening, on the one hand, into the combustion chamber 5 via an intake orifice that is selectively opened or closed by an intake valve 6, in the known way, and, on the other hand, into a flange 7 of the cylinder head 3, to which the intake manifold 1 is fixed.

This manifold 1, made essentially of a moldable synthetic material, comprises an upstream plenum 8, itself supplied with air by an air inlet orifice 9 in communication with the outlet of a main device for controlling the intake of air into the engine 2, this device preferably being a throttle body 10 comprising, in a well-known way, a butterfly 11 in the form of a disk mounted to pivot about a transverse axle in a tubular body 12 fixed to the plenum 8 directly upstream of the air inlet orifice 9. The flow of intake air into the plenum 8 is controlled by the position of the butterfly 11 in the body 12 and the plenum 8 is connected to each of the combustion chambers 5 of the engine 2 by at least one downstream air duct 13 which places a respective outlet 14 of the plenum 8 at the upstream end of the air duct 13 in communication with, at its downstream end, a supply orifice 15 of an intake duct 4 of the corresponding combustion chamber 5, this supply orifice 15 being formed in a flange 16 for fixing the manifold 1 to the flange 7 of the cylinder head 3.

To simplify the description, it is assumed, in a simple exemplary application, that the engine 2 is an in-line four-cylinder engine and that the manifold 1 comprises four air ducts 13, namely just one respective duct 13 for each of the four combustion chambers 5 of the engine 2.

The four ducts 13 are substantially identical to one another, and have a cross section which, in this example, is substantially constant and in the shape of a rectangle with rounded corners, each duct 13 being straight along its entire length, it also being possible for the cross section to be circular or oblong and, possibly, to converge very progressively in the downstream direction.

A short distance upstream of the flange 16, each duct 13 has a housing 17 which is inclined from the outside toward the inside of the duct 13 and from the upstream end downstream, to accommodate a fuel injector 18 injecting fuel toward the corresponding supply orifice 15, into the stream of air leaving the corresponding duct 13 via this orifice 15 in the flange 16, so as to supply the single intake duct 4 of the combustion chamber 5 in question with the air-fuel mixture.

Upstream of the housing 17 and of the injector 18, but in its downstream half, each duct 13 has a sudden enlargement 19 delimited by a wall portion running substantially at right angles to the longitudinal axis X—X of the duct 13, this sudden enlargement 19 being followed immediately downstream by a duct portion 20 of cross section that decreases progressively in the downstream direction. This portion 20 with the progressive reduction in cross section ends, at its downstream end 21, upstream of the housing 17 and of the corresponding injector 18, and therefore upstream of the flange 16 and, downstream of this downstream end 21 of the portion 20, the duct 13 has substantially the same cross-sectional shape as it does upstream of the sudden enlargement 19.

In the example depicted in FIG. 1, the sudden enlargement 19 is made on just one side of the longitudinal axis X—X of the duct 13, and more specifically on the same side as the side in which the housing 17 for the injector 18 is made, the term "side" meaning an actual side of a substantially polygonal or quadrilateral perimeter of the duct 13 or alternatively a part or arc of a circular or oblong perimeter of the duct 13.

The sudden increase in passage cross section of the duct 13 afforded by the sudden enlargement 19 is such that the ratio of the cross section of the duct 13 at the sudden enlargement 19 to the cross section of this duct 13 immediately upstream of the enlargement 19 is close to 2.

Thus, in one example of an air duct 13 with a cross section in the shape of a rectangle with rounded corners, if the length of the duct 13 is measured along its longitudinal axis X—X, its width considered at right angles to the axis X—X and to the plane of FIG. 1, and its height measured at right angles to the axis X—X and in the plane of FIG. 1, the height H of the wall 19 of the sudden enlargement is substantially equal to the height of the duct 13 upstream of the sudden enlargement 19 and downstream of the downstream end 21 of the portion 20 with progressive reduction in cross section, if the width of the duct 13 is substantially constant from the outlet 14 of the plenum 8 to the inlet orifice 15 in the downstream flange 16.

In addition, the length of the duct portion 20 with progressive reduction in cross section, that is to say the length, along the longitudinal axis X—X, between the sudden enlargement 19 and the downstream end 21 of this portion 20, is a length L of between about 2.5 times and about 3 times the height H of the sudden enlargement 19.

In this form of embodiment, as the sudden enlargement 19 and the portion 20 with the progressive reduction in cross section lie in a straight part of the duct 13 having a substantially rectangular and constant cross-sectional shape, the portion 20 is delimited by a wall 22 which is a plane inclined in the downstream direction and toward the longitudinal axis X—X of the tube 13, starting from the sudden enlargement 19, which makes production by molding easier.

FIG. 2 depicts an alternative form of embodiment of the sudden enlargement and of the duct portion with the progressive reduction in cross section in a straight part of an air duct as shown in FIG. 1.

In FIG. 2, the sudden enlargement is ensured by a sudden increase in cross section on two opposite sides or on two opposite parts of the perimeter of the air duct 13, with respect to its longitudinal axis X—X. The sudden enlargement is thus limited by two wall portions 19a and 19b which are substantially perpendicular to the longitudinal axis X—X of the duct 13 and, in the case of a duct 13 of quadrilateral cross section, which are each extended in the downstream direction by a respective one of two inclined planes 22a and 22b which form wall portions which, on each side of the axis X—X, delimit the duct portion 20 with the progressive reduction in cross section, as far as the respective downstream ends 21a and 21b of these walls, downstream of which the air duct 13 reverts, in the downstream direction, to a cross section similar to the cross section it has upstream of the sudden enlargement 19a–19b.

In this alternative form of FIG. 2, it is seen again that the ratio of the passage cross section at the sudden enlargement 19a–19b to the cross section of the duct 13 upstream of this sudden enlargement is of the order of 2, and that the length of the duct portion 20 of progressively decreasing cross section (between sudden enlargement 19a, 19b and the downstream ends 21a and 21b of the inclined planes 22a and 22b) is about 2.5 times to about 3 times the height of the sudden enlargement which, in this example, is substantially symmetric with respect to the axis X—X, that is to say of height H/2 for each of the walls 19a and 19b.

In FIG. 2, if the duct 13 is of circular or oblong cross section, then the sudden enlargement can be achieved on two (diametrically) opposed axes of its perimeter, and may even, like the duct portion 20 with progressive reduction in cross section, be of revolution about the axis X—X. The wall portion 19a–19b delimiting the sudden enlargement is then annular, and the duct portion 20 is then a cone frustum. More generally, the bowl of the wall portions 22a and 22b may be a portion of a frustoconical surface.

The exemplary embodiment in FIG. 3 differs from that of FIG. 1 essentially in that practically the downstream half of each air duct 13', connecting the plenum 8' to the flange 16' for fixing to the cylinder head and the engine, is a curved part of this duct 13'. In this case, the sudden enlargement 19' and the duct portion 20' with the progressive reduction in cross section which immediately follows it in the downstream direction are formed, in this curved downstream half of the duct 13' and more specifically on the side of the longitudinal axis X—X of this duct 13' which faces toward the convex side of this curved part of the duct 13', upstream of the housing 17' and of the fuel injector 18' which are also situated on the same side as the sudden enlargement of the tube 13'. Where the center of the radius of curvature of the duct 13' lies on the opposite side to that which has been shown in FIG. 3, an alternative is to locate the injector on the opposite side to the sudden enlargement 19'. The wall portion delimiting the sudden enlargement 19' remains substantially perpendicular to the longitudinal axis of the tube 13', but the wall portion 22' which, on the outside, delimits the duct portion 20' with the progressive reduction in cross section is no longer an inclined plane but is delimited, at least in part, and preferably in its part adjacent its downstream end 21', by a curved surface, the concave side of which faces in the same direction as that of the curved downstream half of the air duct 13'.

In this example too, it is again found that the ratio of the passage cross section at the sudden enlargement 19' to the cross section immediately upstream thereof is of the order of 2 and that the length (measured along the axis of the duct 13') of the portion 20' with the progressive reduction in cross section is about 2.5 times to about 3 times the height of the sudden enlargement 19'.

Thus, in the various embodiments described hereinabove, the sudden enlargement 19, 19a–19b or 19' constitutes an interface that introduces a lag into the transmission of the pressure signal from the throttle body 10 to the passage delimited between the intake valve 6 and its seat in the cylinder head 3, it being possible for this transmission lag to be attributed to the sudden variation in density and pressure in the sudden enlargement, where the pressure drop can be calculated by applying a simplified form of the momentum equation, neglecting friction against the walls, using the known Borda-Carnot formula. The progressive reduction in cross section in the duct portion 20 or 20' immediately downstream of the sudden enlargement, ensures recuperation of energy, by reacceleration of the air stream, and makes it possible to compensate in part for the pressure drop due to the sudden enlargement, in a way similar to the Venturi effect. Thus, purely passive and almost wearproof means that the sudden enlargement and the duct portion with the progressive reduction in cross section constitute, have, in a specific embodiment, afforded the remarkable result of deadening, by about 5 dB, the strident whistling which occurs, under the conditions mentioned hereinabove, in an intake manifold made of plastic similar to those described hereinabove but without these particular means which are the sudden enlargement and the duct portion with the progressive reduction in cross section.

The air intake manifolds according to the invention have their plenum 8 or 8' and their air ducts 13 or 13' made of a moldable synthetic material and, to make them easier to manufacture, each air duct 13 is, for example, obtained by joining together, by thermal fusion or by ultrasonic or vibration welding, two half-shells as depicted in FIG. 4, to produce a straight air duct 13 of the manifold 1 of FIG. 1.

In FIG. 4, the air duct 13 comprises a lower half-shell 13a and an upper half-shell 13b, each having a substantially U-shaped cross section, and each molded as a single piece. These two shells 13a and 13b are joined together along the longitudinal ends of the flanges of their U-shaped cross section. The upper half-shell 13b has the inclined plane 22 and the vertical wall portion 19 which respectively delimit the duct portion 20 and the sudden enlargement of the example of FIG. 1. Of course, along the sides of the inclined plane 22, the air duct 13 is closed by triangular vertical wall portions 23 which complete the demarcation of the portion 20 with the progressive reduction in cross section.

The connecting of a duct 13, thus produced by joining together two longitudinal half-shells molded separately as single parts, on the one hand, to the flange 16, itself molded as a single part or of several assembled parts and, on the other hand, to the plenum 8, itself made by joining together at least two molded parts, can also be achieved by fusion or welding (thermal fusion, ultrasonic or vibration welding) or, as an alternative, each of the half-shells 13a and 13b can be molded as a single part with a respective portion of the flange 16 and a respective portion of the plenum 8.

What is claimed is:

1. An air intake manifold for an internal combustion engine, the manifold being of the type comprising an upstream plenum, common to all the downstream air ducts feeding the combustion chambers of the engine and supplied with air through an air inlet orifice connected to a device for controlling the intake of air to the engine, such as a throttle body, mounted upstream of said inlet orifice, and, for each combustion chamber of the engine, at least one of the downstream air ducts connecting a respective outlet orifice of the plenum to a corresponding supply orifice of said combustion chamber of the engine, said supply orifice being formed in at least one flange that fixes the manifold to a cylinder head of said engine, the plenum and each of the air ducts at least being made of synthetic material, wherein for each combustion chamber of the engine, at least one corresponding downstream air duct has at least one sudden enlargement of its passage cross section, followed immediately in the downstream direction by a duct portion having a progressive reduction in cross section in the downstream direction, ending upstream of said fixing flange.

2. The intake manifold as claimed in claim 1, wherein said sudden enlargement is ensured by a sudden increase in cross section on just one side of the longitudinal axis of said air duct.

3. The intake manifold as claimed in claim 1, wherein said sudden enlargement is ensured by a sudden increase in cross section in at least two opposite sides of said air duct or along the entire periphery thereof.

4. The intake manifold as claimed in any one of claims 1 to 3, wherein the ratio of the cross section of the air duct at said sudden enlargement to the cross section of said air duct immediately upstream of said sudden enlargement is of the order of 2.

5. The intake manifold as claimed in any one of claims 1 to 3, wherein said duct portion with a progressive reduction in cross section extends over a length, along the longitudinal axis of said air duct of between about 2.5 and about 3 times the height of said sudden enlargement, which height is measured substantially at right angles to the longitudinal axis of the air duct at said sudden enlargement, the width of said air duct at right angles to its height and its length being substantially constant.

6. The intake manifold as claimed in any one of claims 1 to 3, wherein each air duct has upstream of said supply orifice in said flange for fixing to the cylinder head, a housing for a fuel injector injecting fuel to said supply orifice, and in that said duct portion with a progressive reduction in cross section has its downstream end situated upstream of said housing for the injector.

7. The intake manifold as claimed in any one of claims 1 to 3, wherein said sudden enlargement and said duct portion with a progressive reduction in cross section are situated substantially in the downstream half of said air duct.

8. The intake manifold as claimed in any one of claims 1 to 3, wherein said sudden enlargement and said duct portion with a progressive reduction in cross section are situated in a substantially straight part of said air duct and said duct portion with a progressive reduction in cross section is at least partially delimited by at least one inclined plane if the air duct has a rectangular cross section.

9. The intake manifold as claimed in any one of claims 1 to 3, wherein said sudden enlargement and said duct portion with progressive reduction in cross section are situated in a curved part of said air duct, and said duct portion with a progressive reduction in cross section is at least partially delimited by a curved surface with the concave side facing in the same direction as said curved part of the air duct.

10. The intake manifold as claimed in any one of claims 1 to 3, wherein each air duct is produced by joining together two half-shells each molded as a single piece, and at least one of which has the sudden enlargement and the duct portion with the progressive reduction in cross section.

11. The intake manifold as claimed in any one of claims 1 to 3, wherein said sudden enlargement and said duct portion with a progressive reduction in cross section are situated in a substantially straight part of said air duct and said duct portion with a progressive reduction in cross section is at least partially delimited by at least one inclined plane if the air duct has at least one portion of a cone frustum if the air duct has a circular or oblong cross section.

* * * * *